Nov. 11, 1958    H. N. HALL ET AL    2,859,818
METHOD OF RECOVERING PETROLEUM

Filed Aug. 20, 1956    3 Sheets-Sheet 1

INVENTORS
HOWARD N. HALL
JOHN W. LA RUE
BY
ATTORNEY

Nov. 11, 1958     H. N. HALL ET AL     2,859,818
METHOD OF RECOVERING PETROLEUM
Filed Aug. 20, 1956     3 Sheets-Sheet 2

INVENTORS
HOWARD N. HALL
JOHN W. LA RUE
BY
ATTORNEY

INVENTORS
HOWARD N. HALL
JOHN W. LA RUE
BY
*Buell B. Hamilton*
ATTORNEY

United States Patent Office 2,859,818
Patented Nov. 11, 1958

2,859,818

METHOD OF RECOVERING PETROLEUM

Howard N. Hall, Tulsa, Okla., and John W. La Rue, Wichita, Kans., assignors to Pan American Petroleum Corporation, a corporation of Delaware Application August 20, 1956, Serial No. 605,159

12 Claims. (Cl. 166—9)

This invention pertains to the art of recovering petroleum oil from underground formations. More specifically it relates to a process to initiate and support or to augment the flow of the oil toward a point in the formation from which the oil is recovered.

Various methods have been devised for recovering oil from its native formation when natural conditions will not support an economical migration rate of the fluid toward a recovery point. These methods are usually termed "secondary" recovery methods and consist of injecting a fluid in an injection well to displace oil within the formation toward a producing well. The "secondary" recovery methods may use air, gas, liquids immiscible with the formation oil, liquids miscible with the formation oil, or a combination of these fluids as a displacement medium. The present art teaches injecting the fluid medium in the formation to form a somewhat vertical bank, or frontal drive, having on its back side the injected fluid and on its front side the formation oil. Thus the injected fluid partially fills each pore space as the oil is displaced. These "secondary" recovery methods depend on maintaining a differential pressure between the injected displacement medium and the formation oil to achieve an economical oil recovery rate. This differential pressure is dependent upon numerous variables such as formation permeability, distance between injection and producing wells, viscosity of injected fluid, and viscosity of fluid within the formation, to name a few. Higher differential pressures are required to maintain an economic flow rate of oil having higher viscosities. For a particular well spacing, oil having a viscosity above a certain value cannot be produced at an economical rate with any reasonable injection pressure. In a formation 10 feet thick which is found at approximately 1,000 feet below the surface, having a permeability of 500 millidarcys and with a well spacing of about 330 feet between injection and producing wells, a pressure differential of about 1,000 p. s. i. between the wells is required to cause an oil of about 500 cps. viscosity to flow into the producing well at an economical rate. For example, in some areas this rate might be about 5 barrels per day. This would be initial flush production and would probably fall off rapidly as the flooding liquid enters the formation pore space.

It is an object of this invention to provide an improved process for recovering viscous oil from its native formation on an economical basis. It is a more specific object of this invention to provide a method for recovering viscous oil in which the oil need not be displaced in a horizontal direction through the pores of the producing formation.

The procedure herein set forth, as embodying this invention, involves drilling a well in the formation, and then selectively fracturing a zone in the upper portion and a zone in the lower portion of the formation. The upper fracture is placed as near the top of the formation as is practical, and extends radially from the well. The upper fracture forms a permeable flow channel through which a solvent may be introduced to contact the formation directly below the channel. The lower fracture is placed as near the base of the formation as possible and preferably encompasses an area considerably larger than the area described by the uppermost fracture. This fracture is a permeable flow channel which affords a path for circulating an oil solvent between the injection well and the producing well.

In the process of selectively creating a fracture, a formation packer, either single or dual, is located and set in the well on the tubing to isolate and confine a selected formation interval which is to be fractured. A fracturing fluid, preferably a low-penetrating fluid is then prepared and pumped into the well. This fluid, when it reaches the formation which is to be fractured, tends to stay in the well and build up a high presure due both to the high viscosity of the formation oil and to the retarded tendency of the low-penetrating fluid, if used, to penetrate the interstices of the formation. Some slight penetration of the formation interstices is sometimes considered desirable, since it is believed to assist in obtaining a fracture by increasing the area exposed to the high pressure fracturing fluid. As pumping or injecting of fluid into the well continues after the low-penetrating fluid reaches the selected formation, the bottom-hole pressure rises until the formation breakdown pressure is reached, at which time, as a general rule, the surface pressure decreases and continues at a substantially constant value. More fracturing fluid may be injected, extending the fracture. This procedure is set out more in detail and claimed in U. S. Patent 2,596,843 Farris. U. S. Patent 2,596,844 Clark teaches and claims a procedure similiar to the above-mentioned patent.

A formation fracture may be formed by under-reaming a selected portion of the borehole in the formation at the desired interval. This weakens the formation and increases the area subjected to lifting forces when hydrostatic pressure is applied. A liquid, subjected to a sufficient hydraulic pressure, is then pumped into the selected portion of the formation and the fracture is thus formed. This procedure is set out more in detail and claimed in U. S. Patent 2,699,212 Dismukes.

It is obvious from the above examples that numerous means presently exist to create a fracture in a formation at a desired interval and therefore any of various means many be applied to created the formation fracture. This fracturing step creates a disk-shaped fracture which extends radially from the well and normally lies in a horizontal plane which is substantially parallel to the bottom or top of the formation.

Following or preceding the fracturing step, one or more wells are drilled in the formation within the area described by the fractures. Preferably the wells would be drilled within the area described by the lower fracture but outside the area described by the upper fracture. A solvent, preferably volatile, is introduced into one of the wells, hereinafter termed an injection well, at a pressure sufficient to establish circulation of the solvent between the injection well and one of the adjacent wells, hereinafter termed a producing well, via the permeable flow channel created by the lower formation fracture. The solvent in the upper permeable flow channel dilutes the formation oil directly below the upper permeable flow channel thus rendering the oil more mobile to gravitational forces and allowing the solvent and oil solution to pass downward into the lower permeable flow channel. The solvent circulating through the lower fracture acts as a transportation medium and carries the oil to the producing well as it drains into the flow channel. This mixture, upon reaching the surface, is separated into its component parts by conventional methods such as distillation, extraction, or the like.

It is to be understood that the preliminary steps, as outlined above, of drilling a well, forming a fracture, and then drilling additional wells may be varied without departing from the spirit of this invention. For example, all the wells may be drilled prior to forming a fracture. It is not essential that the fracture be formed from the injection well as, for example, a fracture may be formed from a producing well toward, or completely into, the injection well. A fracturing procedure may be applied to each well, or selected wells.

The primary purpose of the upper fracture is to establish a permeable channel into which an oil solvent may be introduced. It is not necessary that the upper fracture extend the full distance between the injection well and the producing well, but it is preferable that the facture extend at least 75 percent of the distance from the injection well to the producing well. This feature is desirable in order to allow the solvent to contact an area about the injection well without allowing the solvent to circulate or channel between the injection well and producing well. In the event the upper fracture extends completely between the wells it is desirable to set a packer between the upper and lower fractures within the producing well and make withdrawals from the lower fracture only. This prevents circulation of the solvent in the upper fracture and forces the solvent to act on the formation. Other isolating procedures are also well known such as setting the casing through the formation and perforating the zones of interest. A packer may also be used within the injection well when injecting more than one solvent at the same time or when injecting the same solvent under different pressures or when it is desirable to inject the same solvent in varying amounts into the respective fractured zones.

Generally the formation fracture in the upper part of the formation is essential to the efficient operation of this invention, however, some formations will not require this upper fracture. The formations, not requiring an upper fracture usually have a gas cap which will afford sufficient permeability to allow flow of the solvent through the gas cap above the oil in the formation.

The purpose of the lower fracture is to create a chamber into which the viscous formation oil may drain. The solvent is circulated through the lower fracture to dilute the oil within the fracture and to move the drained oil into the producing well. It is therefore desirable to extend the lower fracture from the injection well into the producing well thus requiring small differential pressures to establish and maintain circulation of solvent between the injection and producing wells.

Figure 4:
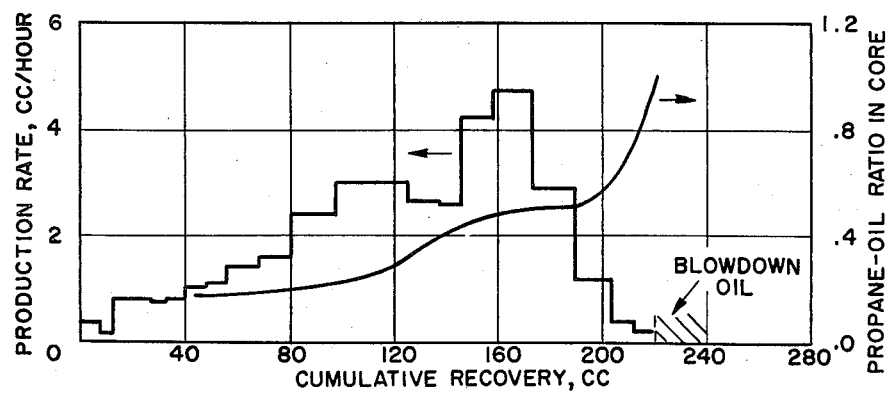

Figure 4 graphically represents the results of the first laboratory experiment using propane vapor to recover mineral oil from a core. The production rate of the mineral oil and the propane to mineral oil ratio within the core are plotted versus the cumulative oil recovery.

Figure 5:
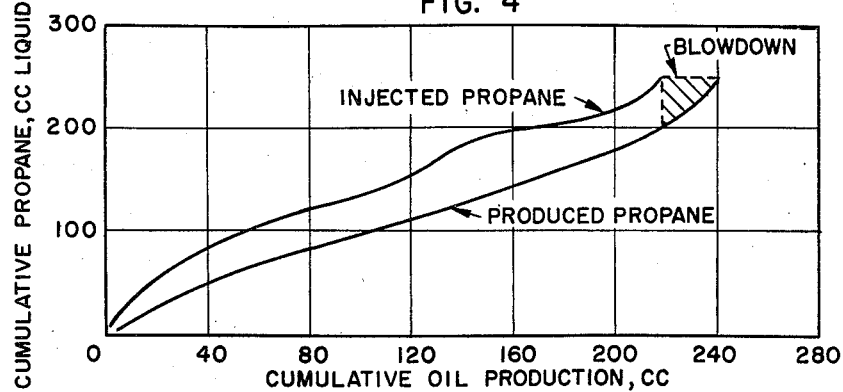

Figure 5 graphically represents the amount of propane vapor injected and the amount of propane vapor recovered versus the cumulative formation oil recovery for the first laboratory experiment.

Figure 6:
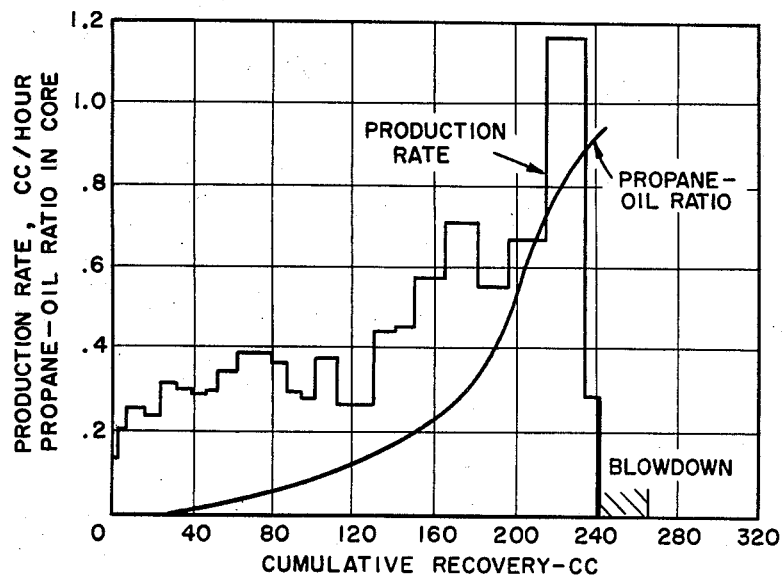

Figure 6 graphically represents the results of the second laboratory experiment using propane vapor to recover eastern Kansas crude from a core. The production rate of crude oil and the propane-oil ratio within the core are plotted versus the cumulative oil recovery.

Figure 7:
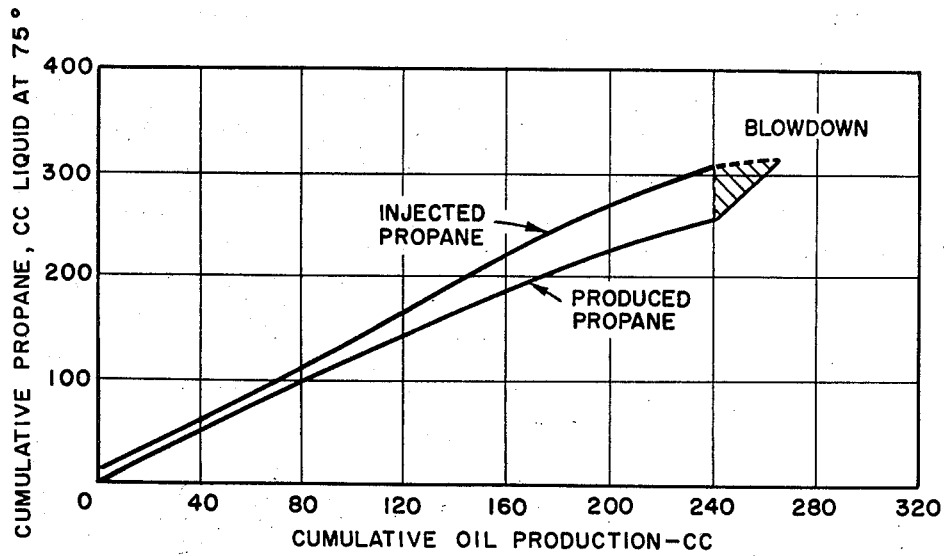

Figure 7 graphically represents the amount of propane vapor injected and the amount of propane recovered versus the cumulative formation oil recovery for the second laboratory experiment.

Figure 1:
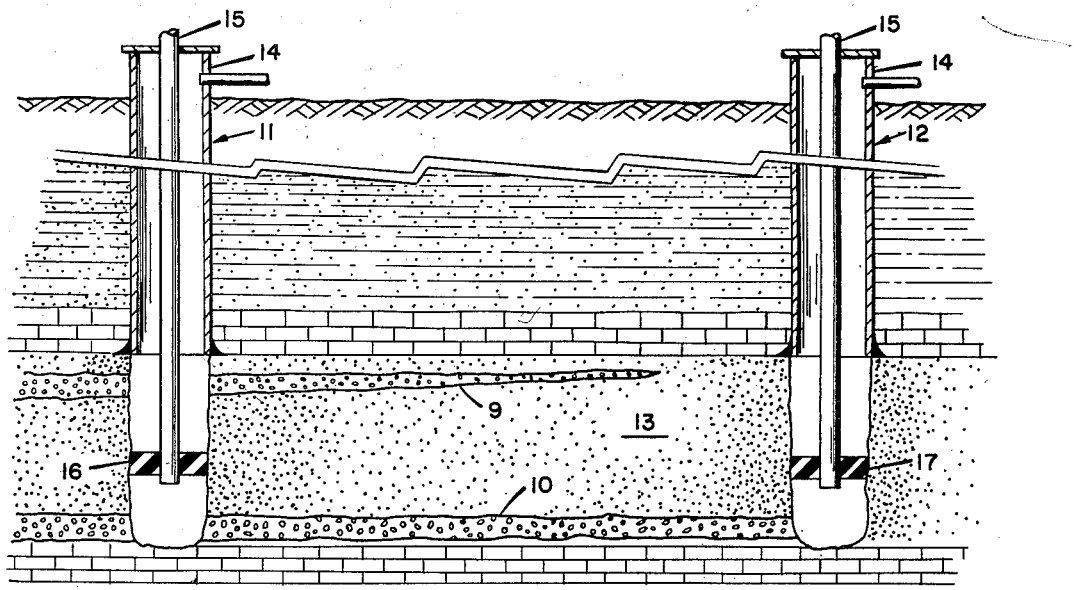
Figure 1 is a horizontal view, partially in cross-section, of a viscous oil-bearing formation with its cap rock and overburden. The figure illustrates the injection well, the producing well, the lower formation fracture and the upper formation fracture which have been placed in the oil-bearing formation.

Figure 1 illustrates the elements used in the preferred embodiment of this invention, i. e., an upper fracture 9, lower fracture 10, injection well 11, and producing well 12, as they are placed within the formation 13. Casing 14 may be set within the formation such that a section of open hole remains, as shown, or the casing may be set through the formation and the zones of interest perforated in a conventional manner. Tubing 15 may be run within the casing string and landed in a conventional manner. The injection well tubing may optionally carry one or more packers 16 which are used for isolating various zones of the formation. The producing well tubing may also carry one or more packers 17.

Figure 2:
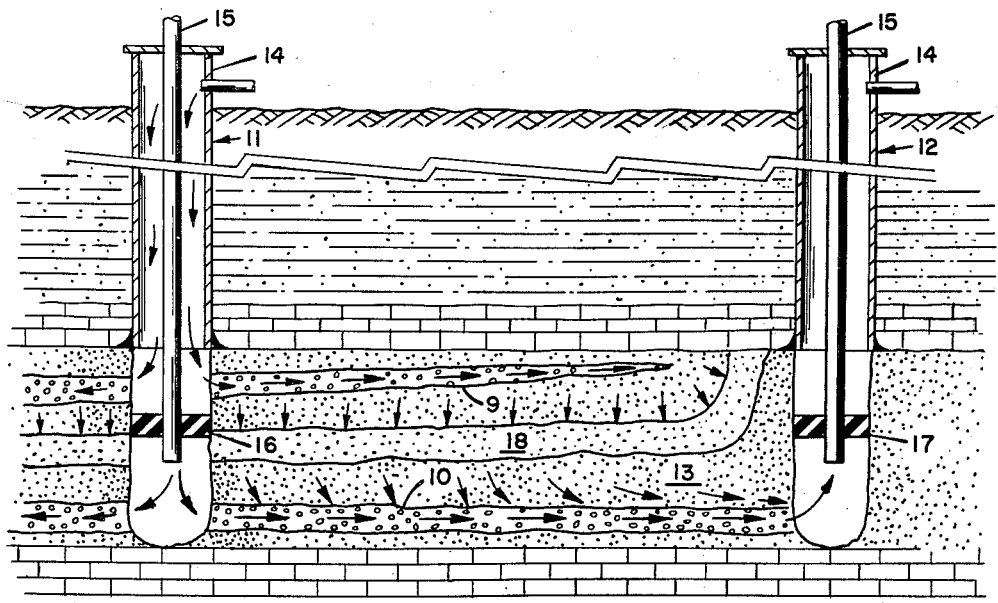
Figure 2 is a view similar to Figure 1 except it diagrammatically illustrates the operation of the solvent in the upper fracture acting on the formation oil and further illustrates the action of the solvent in the lower fracture in moving the oil from the drainage fracture into the producing well.

Figure 2 diagrammatically illustrates the operation of the invention. The arrows indicate the direction of flow of fluid into the upper fracture 9 from the casing-tubing annulus and its subsequent action within the formation in forming the mixing zone 18. The flow of solvent is also shown from the tubing through the lower fracture 10 and into the producing well.

In outlining the procedure embodying this invention it is noted that the viscous oil within the formation, under natural conditions, will move into the producing well at a very slow rate. The oil, due to its high viscosity, cannot be moved readily in a horizontal direction through the sand by liquid or gaseous reagents subjected to a reasonable pressure. After the elements, i. e., an upper fracture 9, lower fracture 10, injection well 11, and producing well 12, have been placed within the formation 13 (Figure 1), the path of least resistance to fluid flow from the formation to the producing well is downward into the lower fracture and thence into the producing well through the permeable lower fracture 10. With this in mind, a solvent, preferably one which is volatile at formation temperature and pressure, is delivered into the upper fracture 9 from the injection well 11 and under such conditions as to promote contact of the solvent with the formation directly below the upper fracture 9. The solvent in passing downward into the formation containing the viscous oil dilutes the oil rendering it less viscous and thus allowing the oil to move vertically downward under the influence of gravity into the lower fracture. Circulation of solvent is maintained in the lower fracture under such conditions as to promote flow of the solvent and formation oil into the producing well 12 from which point the solution is recovered. This action is diagrammatically illustrated in Figure 2.

The term "solvent," as employed in describing this invention, may broadly be any solvent for viscous petroleum oils. Examples include carbon tetrachloride, alcohols, such as ethanol or the like, which are less viscous under reservoir conditions than the formation oil. The solvent may be a hydrocarbon such as gasoline, kerosene, or a more volatile, normally gaseous, liquefiable hydrocarbon having from 2 to 5 carbon atoms. Other normally gaseous, liquefiable solvents include dichloro-difluoromethane, methyl chloride, dimethylether, sulfur dioxide, and methyl amine. The solvent could also be a mixture of the above-mentioned agents. Small amounts of other materials such as methane may also be present.

In using this invention, crude oil may sometimes precipitate asphaltenes when propane is put into solution therewith. This phenomenon may be mitigated by the addition of small amounts of asphaltene solvents to the propane. Examples of typical asphaltene solvents are carbon tetrachloride, benzene, chloroform, and aromatic hydrocarbons.

A preferred class of solvents is the class of hydrocarbons having from 2 to 4 carbon atoms. This class of solvents is preferred in that members of the class dissolve readily within the formation oil and form a zone 18 as shown in Figure 2. This class of solvents is further preferred in that they are plentiful within the areas where underground deposits of oil are found and therefore are relatively inexpensive. These solvents, when injected within the formation in the gaseous phase, go into solution with the formation oil readily and form a contact zone thus preventing channeling. Methane, for example, tends to channel through the formation without forming this zone and therefore does not contact the entire formation on its travel therethrough. The liquid solvents, mentioned above, are operative, but are not as effective or efficient as the gaseous form of solvent. When using liquid solvents the formation is filled with liquid solvent upon depletion, whereas the formation is filled with gaseous material upon depletion when using gaseous solvents. The gaseous forms of solvent therefore require smaller amounts of displacement medium to recover a like amount of oil from the formation. In naming a preferred solvent, propane, a hydrocarbon having three carbon atoms, it is meant that the propane is not chemically pure but may be composed of approximately 90 percent propane with tolerable impurities ranging from methane through pentanes with traces of even higher molecular weight materials.

It is further within the scope of this invention that more than one solvent may be circulated through the formation at the same time. For example, gaseous propane may be injected into the upper formation fracture while simultaneously injecting kerosene in the lower fracture. For reasons of economics, however, it is preferable to inject the same solvent into both fractures simultaneously.

Propane may be injected into the upper fracture 9 and the lower fracture 10 at a pressure below the vapor pressure of the propane under formation temperature in order to maintain the solvent principally in the gaseous phase. The gaseous propane passes into the upper fracture 9 and starts dissolving within the formation oil directly below the upper fracture. The diluted solution directly below the upper fracture is more mobile to vertical flow through the formation than the original formation oil and thus increases the effective head of formation oil on the lower fracture 10. Viscous oil starts draining into the lower fracture 10 and as it drains into the fracture the circulating solvent in the lower fracture carries the formation oil in solution into the producing well. The action of the solvent in the upper fracture creates a transition zone 18 of oil-solvent mixture which is considerably less viscous than the formation oil. The oil-solvent mixture forms a transition zone 18 which prevents the passage or channeling of the gaseous solvent from the upper fracture to the lower fracture. The formation above the zone 18 and below the upper fracture 9 is completely cleansed of all the recoverable residual oil and thus is inert to further flow of solvent therethrough. That is, further flow of solvent will remove no further oil from the formation above zone 18. This zone of oil-solvent mixture passes downward from the upper fracture until it reaches the lower fracture at which time all the recoverable oil has been recovered.

In applying the invention to a formation it is frequently beneficial to change the direction of flow of the gaseous propane through the lower fracture. This is accomplished by using an alternate well as a producing well, using an alternate well as an injection well, or using alternate wells for both producing and injection wells. This change of direction of flow through the lower fracture insures a more even progression of the oil-solvent mixture zone from the upper fracture through the formation to the lower fracture as well as a more efficient purging of oil from the lower fracture.

Reduction of the formation oil viscosity is beneficial to the efficient operation of the present invention and thus other means of reducing the entrapped formation oil viscosity may be applied without departing from the spirit of the invention. The viscosity may be reduced as, for example, by supplying a heat source such as heated gas, bottom hole heaters, heating the injected propane or other like methods.

In order to evaluate the operability and advantages of the present invention, experiments were conducted in a manner to simulate field conditions. In these experiments, a 1½ inch diameter sand column 30 inches in length was prepared consisting of unconsolidated sand. The sand used in the preparation of the sand column was No. 16 "Ottawa" sand of 140–230 U. S. Standard Sieve size and was packed such that the column had a porosity of 34 percent and a permeability of 3 darcys.

The first experiment consisted of saturating the sand column with 266.0 cc. of liquid heavy paraffin (mineral oil) having a viscosity of 128.7 centipoises at a temperature of 75° F. The core was 100 percent saturated with this mineral oil. The oil would not flow from the sand column at a detectable rate under room temperature and pressure due to its high viscosity. The sand column holder 19 (Figure 3) encompassing the sand column 20, was constructed with a chamber 21 simulating the lower fracture and a vapor line 22 connecting the top of the core holder simulating the upper fracture. The sand column was thus in a condition simulating that to be expected in a viscous oil formation in which the oil is so viscous that very high pressures are required to promote horizontal flow. Thereafter, application of the process of this invention was initiated.

Figure 3:
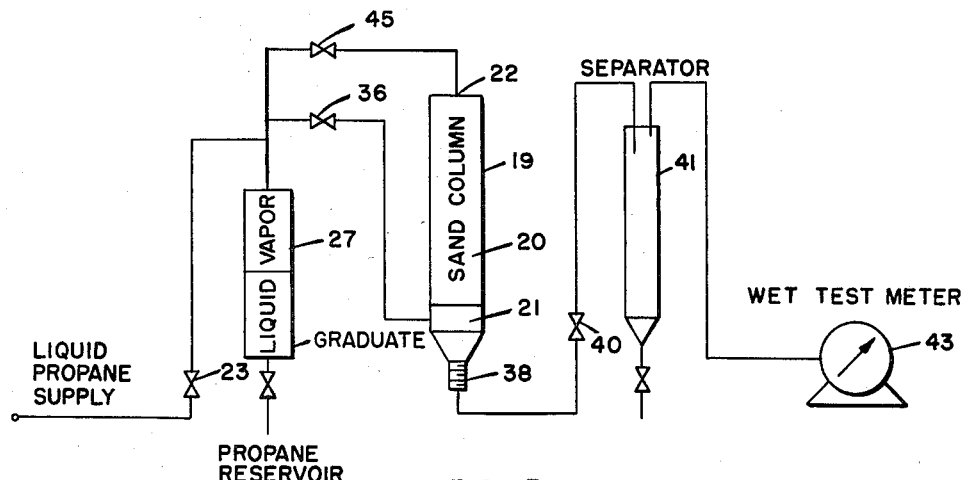
Figure 3 is a schematic view of the arrangement of laboratory apparatus for carrying out an experiment to determine the ultimate oil recovery under simulated formation conditions.

In referring to Figure 3 all the laboratory apparatus valves were initially closed. Liquid propane valve 23 was opened to admit propane to the graduated vessel 27, hereinafter referred to as graduate for reasons of brevity.

An initial charge of propane, 99 percent pure, was placed in the graduate 27 after which the liquid propane valve 23 was closed and a reading was taken of the quantity of propane entrapped in the graduate. The lower flow channel entrance valve 36 was then opened thus allowing a charge of gaseous propane to enter the lower flow channel 21 of the sand column holder 19. The charge was measured by the differential level of liquid propane within the graduate 27 and varied from 8.0 to 30.2 cubic centimeters. The charges were left in contact with the lower end of the sand column 20 for varying intervals of time. The interval of time used varied from 24 hours to 198 hours. After sufficient contact time had elapsed, as evidenced by the collection of crude in the calibrated cavity 38, the flow channel entrance valve 36 was closed. The lower flow channel exit valve 40 was opened allowing the residual pressure in the sand column holder 19 to move the recovered crude from the calibrated cavity 38 into the separator 41. The gas from the separator passed into the wet test meter 43 and the volume passing through the meter was recorded. The volume of recovered oil was measured as it was accumulated in the separator 41. This cycle was repeated until approximately 22 cubic centimeters had been recovered.

The next step was to introduce propane vapors to both ends of the sand column holder 19 within the simulated upper flow channel 22 and the simulated lower flow channel 21. This was accomplished by filling the graduate 27 as above explained and taking a liquid propane reading after which the lower flow channel entrance valve 36, and the upper flow channel entrance valve 45 were opened to admit the propane vapor atmosphere within the graduate to contact the sand column at its upper end and lower end simultaneously. After sufficient contact time had elapsed, as evidenced by the collection of crude in the calibrated cavity 38, the crude was displaced into the separator as explained above. The results of the experiment are illustrated in Figure 4 and Figure 5. Figure 4 illustrates the rate of oil recovery versus the cumulative amount of oil recovered as well as indicating the amount of propane necessary to displace the formation oil. This is shown as a function of the concentration of propane and the concentration of formation oil versus the cumulative recovery volume of formation oil. Figure 5 represents the amount of propane injected and the amount recovered as evidenced by the graduate 27 readings and the wet test meter 43 (Figure 3) readings. The cumulative volumes in Figure 5 include the propane injected into the bottom chamber only and the oil recovered in this operation. The difference of these two values is amount of propane present in zone 24 and retained in the formation above this zone.

A second experiment was conducted using a sand column saturated with 295.9 cc. of a heavy asphaltic base crude obtained from eastern Kansas. The second experiment was conducted on the same type sand column under the same room conditions and using the same propane supply as was used in the first experiment. Propane vapors were injected during the second experiment to both ends of the sand column as explained above. The results of the second experiment are graphically shown in Figure 6 and Figure 7. Figure 6 illustrates the rate of oil recovery versus the cumulative amount of oil recovered as well as indicating the amount of propane necessary to displace the formation oil. This is shown as a function of the concentration of propane and the concentration of formation oil versus the cumulative recovery volume of formation oil. Figure 7 represents the amount of propane injected and the amount recovered as evidenced by the graduate 27 readings and the wet test meter 43 (Figure 3) readings. The difference of these two values is the amount of propane actually necessary to displace the formation oil.

The example given above is applicable to a thin zone with uniform permeability profiles. Frequently formations are encountered which contain relatively impervious, thin stringers. These impervious stringers restrict the application of the invention to each zone between the stringers. Thus each permeable zone is considered as a separate formation in applying the principle above outlined and separate flow channels are formed in the upper and lower portions of each zone. An example would be a formation whose top is found at 1,000 feet below the surface and terminate at 1,100 feet below the surface. An examination of the well data such as core analysis, sample analysis, well logs, etc., reveals an impervious stringer from 1,025 feet to 1,027 feet and another such stringer from 1,059 feet to 1,065 feet. In applying this invention to a formation of this type the zone from 1,000 feet to 1,025 feet is considered as a formation in itself. The upper fracture is created immediately below the formation top of 1,000 feet and the lower fracture is created immediately above the stringer starting at 1,025 feet. The process is then applied to this zone independent of the lower zones. Thus we have three zones from 1,000–1,025 feet, from 1,027–1,059 feet, and a third from 1,065–1,100 feet, which will be treated as if they existed as separate and distinct formations.

When a thick formation is encountered having a homogeneous permeability profile it is sometimes beneficial to create more than two formation fractures. The formation conditions such as oil viscosity, formation permeability, solvent viscosity, etc., will determine the rate of oil recovery for a given circulation of solvent through the formation. The rate of oil recovery may sometimes be increased in these thick formations by creating intermediate fractures between the upper and lower fractures. For example, in a formation 150 feet thick containing a fracture near its top and near its bottom it may be found that in applying this invention oil cannot be produced through the lower fracture at a desired rate. The next step is then to create intermediate fractures between the upper and lower fractures. For example, in the 150 foot formation a total of five or more fractures may be created. It is desirable to form the intermediate fractures to approximately the same extent as the upper fracture so the intermediate fractures act to dilute the formation oil rather than transport the oil to the producing well. The fracture, through which circulation is maintained, requires a large ratio of circulated solvent to recovered oil. It is therefore desirable to have circulation of solvent through only one (the lowermost) fracture. The remaining upper and intermediate fractures are used for the same purpose as the upper fracture, namely for contact fractures to dilute the formation oil and generally not for circulation fractures to transport the diluted oil into the producing well.

The above discussion of the invention has been directed to viscous oils for purposes of clarity in explanation and theory The above invention applies equally well to formations containing less viscous oils in the range of about 5 centipoises and may also be applied to a formation as a secondary recovery method in lieu of conventional secondary recovery methods or as a recovery method after the conventional methods are no longer commercially attractive.

It will be understood that numerous modifications and variations in the systems of production outlined above can be carried out without departing from the spirit of this invention, which is best defined by the scope of the appended claims.

We claim:

1. A method of recovering petroleum from an underground formation having in communication therewith a plurality of wells, said formation having a first permeable flow channel in the lower portion thereof and a second permeable flow channel in the upper portion thereof, said first permeable flow channel including at least one formation fracture extending from at least one of said wells substantially parallel to the bottom of said formation toward at least one of the remaining wells, which comprises injecting a petroleum solvent into at least one of said wells, and into said second permeable flow channel whereby said solvent contacts said formation below said second flow channel diluting residual petroleum therein, preventing flow of said solvent through said second flow channel directly to another well, allowing vertical gravity flow of the diluted petroleum into said first flow channel, and injecting a petroleum solvent in at least one of said wells and through said first permeable flow channel into at least one of the remaining wells, whereby said petroleum solvent in passing through said first permeable flow channel dissolves and carries said petroleum to at least one remaining well from which said petroleum solvent and said petroleum may be recovered.

2. The method of claim 1 in which said petroleum solvent is injected into said first flow channel and said second flow channel from the same well.

3. The method of claim 1 in which said second flow channel includes at least one formation fracture extending from one of said wells substantially parallel to the top of said formation toward the remaining wells.

4. The method of claim 1 in which said petroleum solvent is principally in the vapor phase.

5. A method of recovering petroleum from an underground formation having in communication therewith a plurality of wells, said formation having a first permeable flow channel in the lower portion thereof, and a second permeable flow channel in the upper portion thereof, said first permeable flow channel including at least one formation fracture extending from at least one of said wells substantially parallel to the bottom of said formation toward the remaining wells, which comprises injecting a first petroleum solvent into at least one of said wells and into said second flow channel, whereby said solvent contacts said formation below said second flow channel to dilute residual petroleum therein, preventing flow of said solvent through said second flow channel directly to another well, allowing vertical gravity flow of the diluted petroleum into said first flow channel, and injecting a second petroleum solvent in at least one of said wells and through said first permeable flow channel into at least one of the remaining wells, whereby said petroleum solvent in passing through said first permeable flow channel dissolves and carries said petroleum to at least one of said remaining wells from which said second petroleum solvent and said petroleum may be recovered.

6. The method of claim 5 in which said first petroleum solvent is a hydrocarbon having from 2 to 5 carbon atoms and is principally in the gaseous phase.

7. A method of recovering petroleum from an underground formation having in communication therewith at least one injection well and at least one producing well, said formation having a first permeable flow channel in the lower portion thereof including at least one formation fracture substantially parallel to the bottom of said formation and extending from at least one of said wells toward at least one of the remaining wells which comprises forming a second permeable flow channel in the upper portion of said formation, said second permeable flow channel including at least one formation fracture substantially parallel to the top of said formation extending from said at least one injection well toward at least one of the remaining wells, injecting a petroleum solvent into said at least one injection well and into said second permeable flow channel whereby said solvent contacts said formation below said upper portion to dilute residual petroleum therein, preventing flow of said solvent through said second flow channel directly to another well, allowing vertical gravity flow of the diluted petroleum into said first flow channel, and injecting a petroleum solvent into said at least one injection well and through said first permeable flow channel into said at least one producing well whereby said petroleum solvent in passing through said first permeable flow channel dissolves and carries said petroleum to said at least one producing well from which said petroleum solvent and said petroleum may be recovered.

8. A method of recovering petroleum from an underground formation, said formation having in communication therewith at least one producing well and at least one injection well, said method including the steps of forming a first permeable flow channel in the lower portion of said formation, said first permeable flow channel including at least one formation fracture extending from one of said wells substantially parallel to the bottom of said formation toward the other of said wells, forming a second permeable flow channel in the upper portion of said formation, said second permeable flow channel including at least one formation fracture extending from one of said wells substantially parallel to the top of said formation toward the other of said wells, injecting a petroleum solvent into said at least one injection well and into said second permeable flow channel whereby said solvent contacts said formation below said upper portion diluting residual petroleum within said formation, preventing flow of said solvent through said second flow channel directly to another well, allowing vertical gravity flow of the diluted petroleum into said first flow channel, and injecting a petroleum solvent into at least one injection well and through said first permeable flow channel into at least one producing well whereby said petroleum solvent in passing through said first permeable flow channel dissolves and carries said petroleum to said at least one producing well from which said petroleum solvent and said petroleum may be recovered.

9. A method of recovering petroleum from an underground formation, said formation having in communication therewith at least one producing well and at least one injection well, said formation having a first permeable flow channel in the lower portion of said formation, said first permeable flow channel including at least one formation fracture extending from said at least one injection well into said at least one producing well substantially parallel to the bottom of said formation, said formation having a second permeable flow channel in the upper portion of said formation, said second permeable flow channel including at least one formation fracture extending from one of said wells substantially parallel to the top of said formation, said method including the steps of injecting a petroleum solvent into said at least one injection well and into said second permeable flow channel whereby said solvent contacts said formation below said second permeable flow channel diluting the residual petroleum within said formation, preventing flow of said solvent through said second flow channel directly to another well, allowing vertical gravity flow of the diluted petroleum into said first flow channel, and injecting a petroleum solvent into at least one injection well and through said first permeable flow channel into said at least one producing well whereby said petroleum solvent in passing through said first permeable flow channel dissolves and carries said petroleum to said at least one producing well from which said petroleum solvent and said petroleum may be recovered.

10. A method of recovering petroleum from an underground formation, said formation having in communication therewith at least one producing well and at least one injection well, said method including the steps of forming a first permeable flow channel in the lower portion of said formation, said first flow channel including at least one formation fracture extending from one of said wells parallel to the bottom of said formation, into another of said wells forming a second permeable flow channel in the upper portion of said formation, said second permeable flow channel including at least one formation fracture extending parallel to the top of said formation, from one of said wells into another of said wells injecting a petroleum solvent into said at least one injection well and into said second permeable flow channel whereby said solvent contacts said formation below said second permeable flow channel diluting the residual petroleum within said formation, preventing flow of said solvent through said second flow channel directly to another well, allowing vertical gravity flow of the diluted petroleum into said first flow channel, injecting a petroleum solvent into said at least one injection well and through said first permeable flow channel into said at least one producing well whereby said petroleum solvent in passing through said first permeable flow channel dissolves and carries said petroleum to said at least one producing well, and producing from an isolated zone within said at least one producing well, said isolated zone including said first permeable flow channel, and excluding said second permeable flow channel.

11. A method of recovering petroleum from an underground formation, said method including the steps of drilling an injection well in said formation, forming a first fracture extending from said injection well in the lower portion of said formation and substantially parallel to the bottom of said formation, whereby said first fracture describes a first area surrounding said injection well, forming a second fracture extending from said injection well in the upper portion of said formation and substantially parallel to the top of said formation, whereby said second fracture describes a second area surrounding said injection well substantially smaller than said first area, thereafter drilling a producing well in said formation within said first area and outside of said second area, injecting a petroleum solvent in said second fracture whereby said solvent contacts said formation below said second fracture diluting the residual petroleum within said formation, preventing flow of said solvent through said second flow channel directly to another well, allowing vertical gravity flow of the diluted petroleum into said first flow channel, and circulating a petroleum solvent through said first fracture and into said producing well whereby said solvent in passing through said first fracture dissolves and carries said petroleum into said producing well from which said solvent and said petroleum may be recovered.

12. A method of recovering petroleum from an underground formation, said formation having in communication therewith a producing well and an injection well, said method including the steps of forming a first permeable flow channel in the lower portion of said formation, said first permeable flow channel inclunding at least one fracture extending from said injection well toward said producing well and at least one fracture extending from said producing well toward said injection well, forming a second permeable flow channel in the upper portion of said formation, said second permeable flow channel including at least one formation fracture extending from said injection well toward said producing well, injecting a petroleum solvent into said injection well and into said second permeable flow channel whereby said solvent contacts said formation below said upper permeable flow channel diluting the residual petroleum within said formation, preventing flow of said solvent through said second flow channel directly to another well, allowing vertical gravity flow of the diluted petroleum into said first flow channel, and injecting a petroleum solvent into said injection well and through said first permeable flow channel into said producing well whereby said petroleum solvent in passing through said first permeable flow channel dissolves and carries said petroleum to said producing well from which said petroleum solvent and said petroleum may be recovered.

References Cited in the file of this patent

UNITED STATES PATENTS

| | | |
|---|---|---|
| Re. 23,733 | Farris | Nov. 10, 1953 |
| 2,107,007 | Lang | Feb. 1, 1938 |
| 2,412,765 | Buddrus et al. | Dec. 17, 1946 |
| 2,734,579 | Elkins | Feb. 14, 1956 |